United States Patent [19]
Kingston et al.

[11] Patent Number: 5,825,835
[45] Date of Patent: Oct. 20, 1998

[54] MULTI-USER ACQUISITION PROCEDURE FOR MULTIPOINT-TO-POINT SYNCHRONOUS CDMA SYSTEMS

[75] Inventors: Samuel C. Kingston; Thomas R. Giallorenzi, both of Salt Lake; Robert William Steagall, North Salt Lake, all of Utah; David Matolak, Herndon, Va.

[73] Assignee: L-3 Communications Corporation, New York, N.Y.

[21] Appl. No.: 606,285

[22] Filed: Feb. 23, 1996

[51] Int. Cl.⁶ ........................................... H04L 7/00
[52] U.S. Cl. ..................... 375/367; 375/200; 370/335; 370/342
[58] Field of Search .................... 375/200, 206, 375/354, 356, 358, 209, 210, 208, 367, 335, 342; 370/324, 503, 507, 515, 335, 342; 455/24, 502, 70

[56] References Cited

U.S. PATENT DOCUMENTS

| | | | |
|---|---|---|---|
| 5,103,459 | 4/1992 | Gilhousen et al. | 375/1 |
| 5,245,612 | 9/1993 | Kachi et al. | |
| 5,295,152 | 3/1994 | Gudmundson et al. | 375/1 |
| 5,297,162 | 3/1994 | Lee et al. | 375/1 |
| 5,359,624 | 10/1994 | Lee et al. | 375/1 |
| 5,430,889 | 7/1995 | Hulbert et al. | 455/33.1 |
| 5,499,236 | 3/1996 | Giallorenzi et a. | 370/18 |
| 5,509,035 | 4/1996 | Teidemann, Jr. et al. | 375/356 |
| 5,544,155 | 8/1996 | Lucas et al. | 370/18 |
| 5,568,473 | 10/1996 | Hemmati | 370/18 |
| 5,583,853 | 12/1996 | Giallorenzi et al. | 370/441 |
| 5,619,491 | 4/1997 | Panzer | 370/342 |
| 5,629,934 | 5/1997 | Ghosh et al. | 370/335 |

FOREIGN PATENT DOCUMENTS 0 654 913 A2  5/1995  European Pat. Off. .

*Primary Examiner*—Wellington Chin
*Assistant Examiner*—Jean B. Corrielus
*Attorney, Agent, or Firm*—Perman & Green, LLP

[57] ABSTRACT

Disclosed are methods and apparatus for use in a synchronous CDMA communications system (10) that employs orthogonal pn spreading codes. The methods are intended for synchronizing transmissions from a subscriber unit (SU 14) to a radio base unit (RBU 12), and include the steps of: (a) transmitting individual ones of a plurality of bursts from the SU to the RBU, each burst being transmitted with a different pn spreading code timing alignment; (b) receiving individual ones of the plurality of bursts with the RBU and determining a power estimate of each received burst; and (c) in response to a determined power estimate of one of the bursts exceeding a threshold, sending a message from the RBU to the SU. The message indicates that the SU is to use for subsequent transmissions the pn spreading code timing alignment that was employed when transmitting the burst that exceeded the threshold. In a preferred embodiment of this invention the step of transmitting transmits an indication of the pn spreading code timing alignment used when transmitting a given one of the bursts. Each burst is transmitted with a pn spreading code timing alignment that differs by ½ chip from a previous pn spreading code timing alignment.

17 Claims, 8 Drawing Sheets

MULTI-USER ACQUISITION PROCEDURE FOR MULTIPOINT-TO-POINT SYNCHRONOUS CDMA SYSTEMS

CROSS-REFERENCE TO A RELATED PATENT APPLICATION

This patent application is related to commonly assigned U.S. patent application Ser. No. 08/606,378, filed Feb. 23, 1996, entitled "A MULTI-USER ACQUISITION PROCEDURE FOR POINT-TO-MULTIPOINT SYNCHRONOUS CDMA SYSTEMS", by S. Kingston et al.

FIELD OF THE INVENTION

This invention pertains generally to code division, multiple access (CDMA) communication systems and, in particular, to direct-sequence (DS) multipoint-to-point synchronous CDMA communications systems.

BACKGROUND OF THE INVENTION

In a CDMA communications system a plurality of user communication signals can be transmitted within, i.e., share, a same portion of the frequency spectrum. This is accomplished by providing a plurality of different pseudonoise (pn) binary code sequences (e.g., one for each user) that modulate a carrier, thereby "spreading" the spectrum of the resulting waveform. In a given receiver all of the user signals are received, and one is selected by applying an assigned one of the pn binary code sequences to a correlator to extract only the signal energy intended for the receiver, thereby "despreading" the received CDMA transmission. All other (uncorrelated) user transmissions appear as noise.

One type of CDMA communication system is specified by a document referred to as EIA/TIA/IS-95. The system as specified uses a plurality of base stations that establish and maintain bidirectional direct-sequence (DS) CDMA links with a plurality of mobile stations (e.g., cellular telephones). One feature of the IS-95 system is the presence of a pilot channel that is transmitted by each base station.

The pilot channel is an unmodulated, direct-sequence spread spectrum signal that is transmitted continuously by each CDMA base station. The pilot channel allows a mobile station to acquire the timing of the Forward CDMA channel (i.e., from the base station to the mobile station), provides a phase reference for coherent demodulation, and provides a reference for signal strength comparisons between base stations for determining when to handoff. The pilot pn sequence is defined as a pair of modified maximal length PN sequences with period $2^{15}$ that are used to spread the Forward CDMA channel and the Reverse CDMA channel. Different base stations are identified by different pilot PN sequence offsets. A pilot pn sequence offset index is defined to be in units of 64 pn chips, relative to a zero offset pilot pn sequence. A pn chip is defined as one bit in the pn sequence. The pilot strength is defined as the ratio of received pilot energy to overall received energy.

Walsh functions are a class of $2^N$ time orthogonal binary functions that are used to establish orthogonality between the different pn binary code sequences used by the pilot and user channels.

In conventional practice it is known to vary the base station's receiver timing phase until synchronization with a subscriber unit is achieved. However, this technique performs poorly due at least to the large amount of multi-user interference that is present when the receiver varies its timing offset from a correct value. This is because the multi-user interference power level will be comparable to the signal power when the user is not synchronized in a synchronous CDMA communications system. As such, the receiver has difficulty in distinguishing the correct timing phase from incorrect phases due to the strong interference.

OBJECTS OF THE INVENTION

It is a first object of this invention to provide methods and apparatus to enable a subscriber unit to synchronize to a synchronous CDMA communications system.

It is a second object of this invention to provide methods and apparatus to enable subscriber units using orthogonal pn sequences to synchronize to a synchronous CDMA communications system, wherein a given one of the subscriber units varies its transmitter timing phase until a radio base unit signals the subscriber unit to terminate varying the timing phase, thereby selecting a current timing phase for use by the subscriber unit.

It is a further object of this invention to provide methods and apparatus to enable subscriber units using orthogonal pn sequences to synchronize to a synchronous CDMA communications system, wherein a given one of the subscriber units varies its transmitter timing phase over a large number (typically twice the processing gain) timing phases, while a radio base unit monitors the received transmissions and selects a best timing phase for use by the subscriber station.

SUMMARY OF THE INVENTION

The foregoing and other problems are overcome and the objects of the invention are realized by methods and apparatus in accordance with embodiments of this invention, wherein a subscriber unit is provided with circuitry and methods enabling synchronization with a central point, e.g., a radio base unit, of a CDMA communications system in the presence of a plurality of interfering other subscriber units.

In a first aspect this invention teaches a method for use in a synchronous CDMA communications system that employs orthogonal pn spreading codes. The method is intended for synchronizing transmissions from a subscriber unit (SU) to a radio base unit (RBU), and includes the steps of: (a) transmitting individual ones of a plurality of bursts from the SU to the RBU, each burst being transmitted with a different pn spreading code timing alignment; (b) receiving individual ones of the plurality of bursts with the RBU and determining a power estimate of each received burst; and (c) in response to a determined power estimate of one of the bursts exceeding a threshold, sending a message from the RBU to the SU. The message indicates that the SU is to use for subsequent transmissions the pn spreading code timing alignment that was employed when transmitting the burst that exceeded the threshold. In a preferred embodiment of this invention the step of transmitting transmits an indication of the pn spreading code timing alignment used when transmitting a given one of the bursts. Each burst is transmitted with a pn spreading code timing alignment that differs by ½ chip from a previous pn spreading code timing alignment.

The RBU executes the following steps when receiving the SU burst transmissions: summing M samples per chip to obtain a first result; despreading the first result; summing L chips per symbol from the first result to obtain a second result; summing a plurality of symbols from the second result to obtain a power estimate of a current pn spreading code timing alignment that was transmitted by the SU; obtaining a scaled averaged power estimate that includes a power estimate from a previous pn spreading code alignment for forming the threshold; and comparing the power estimate of the current pn spreading code timing alignment to the threshold.

If the SU exhausts a predetermined range of permissible pn spreading code timing alignments without receiving a message from the RBU, the SU, performs the steps of increasing an output power of an SU transmitter, and then re-transmitting the plurality of bursts.

Each transmitted burst is preferably separated by a period of no transmission by the SU (i.e., a "quiet" period). During this time the RBU may also determine a power estimate.

Further in accordance with this invention the method executes the steps of: in response in the RBU sending the message, changing the pn spreading code timing alignment by a predetermined number of chips; transmitting individual ones of a second plurality of bursts from the SU to the RBU, each burst being transmitted with a different pn spreading code timing alignment; receiving the second plurality of bursts in RBU and storing, for each received burst, a corresponding magnitude of a pn correlation value; and after receiving a predetermined number of the second bursts, transmitting a message to the SU from the RBU. In this case the message instructs the SU to use for subsequent transmissions a pn spreading code timing alignment that corresponds to a largest stored pn correlation value.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
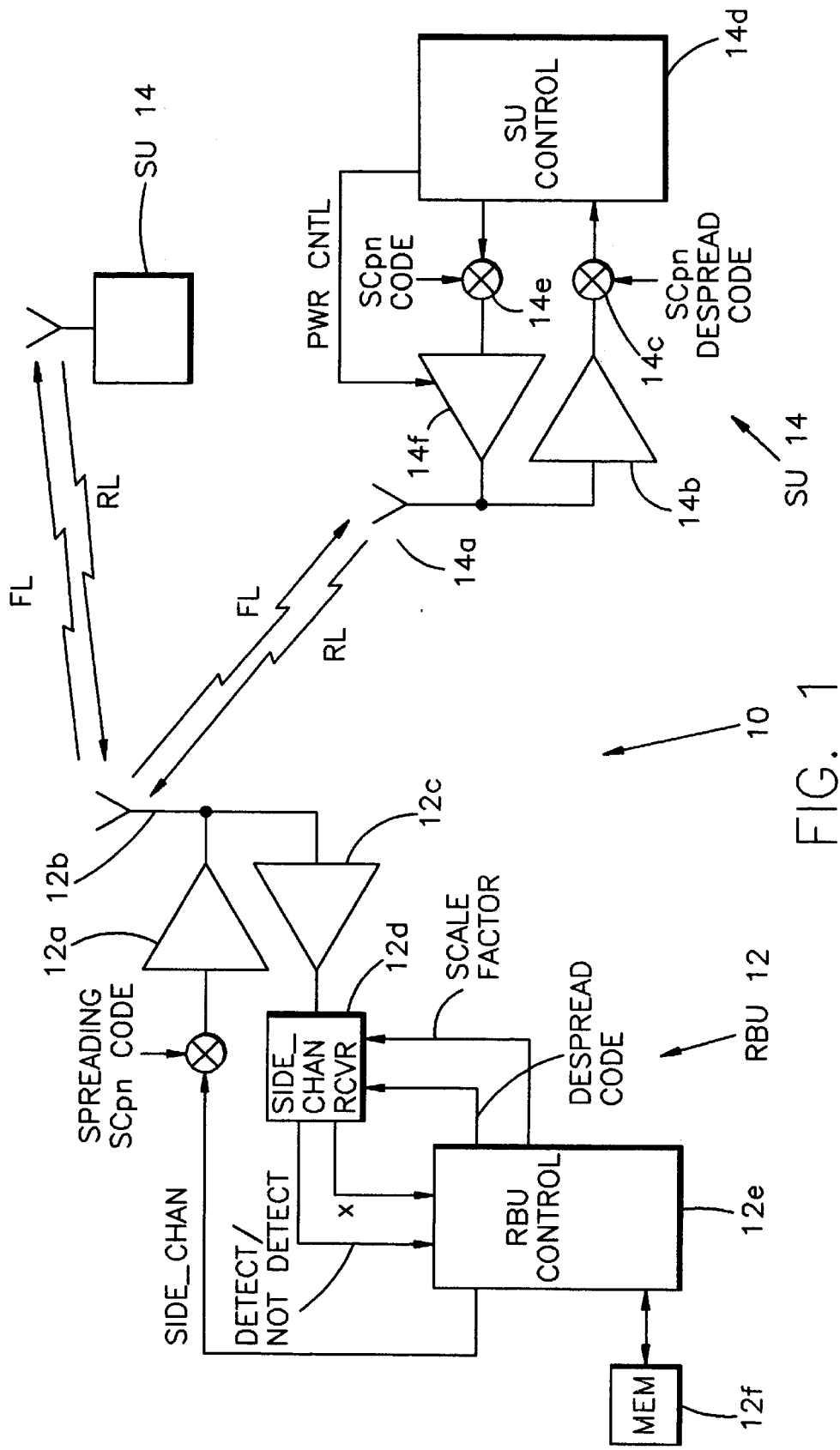
FIG. 1 is a simplified block diagram of a synchronous, DSCDMA communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

Referring to FIG. 1, a synchronous CDMA communications system 10, which in presently preferred embodiments of this invention is embodied as a fixed wireless system (FWL), is considered herein to be a CDMA system wherein forward link (FL) transmissions from a radio base unit (RBU) 12 for a plurality of transceiver units, referred to herein as user or subscriber units (SUs) 14, are bit and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU, and to generally perform bidirectional communications. The synchronization aspect is of most concern to the teaching of this invention. The FWL is suitable for use in implementing a telecommunications system that conveys voice and/or data between the RBU 12 and the SUs 14.

The RBU 12 includes circuitry for generating a plurality of user signals (USER_1 to USER_n), which are not shown in FIG. 1, and an asynchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 31 code channels, and has a center frequency in the range of 2 GHz to 3 GHz.

The RBU 12 also includes a receiver 12c having an output coupled to a side channel receiver 12d. The side channel receiver 12d is shown in greater detail in FIG. 2. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of a number of SUs 14 that are transmitting on the reverse side channel. The side channel receiver 12d outputs a detect/not detect signal to the RBU controller 12e for indicating a detection of a transmission from one of the SUs 14, and also output a power estimate value $\chi$, as described below. A read/write memory (MEM) 12f is bidirectionally coupled to the RBU controller 12e for storing system parameters and other information, such as SU timing phase information and power estimate values, as will be described in further detail below.

Figure 2:
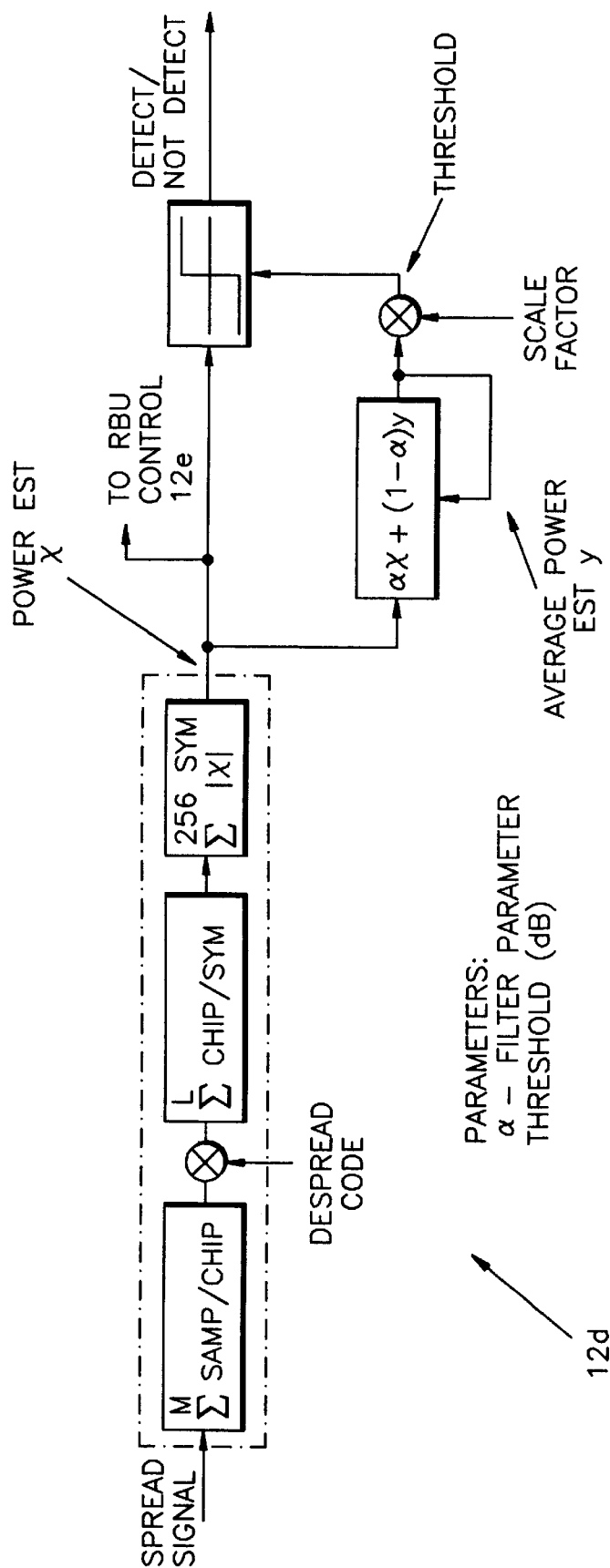
FIG. 2 is a block diagram of the pn code acquisition procedure for the asynchronous side channel receiver of the RBU of FIG. 1. The detection threshold is determined using an IIR filter that removes any dependency on dynamic AGC levels.

Referring to FIG. 2, the side channel receiver 12d receives the spread signal from the receiver 12c and sums some M samples per chip. The sampled spread signal is then despread using the assigned side channel pn code, after which is performed, on soft decisions of the despread signal, a summation of L chips per symbol. The absolute value of some number (e.g., 256) symbols is then determined, which provides the power estimate $\chi$. Summing over 256 symbols reduces the variance of this estimate and thus yields a more accurate result. The power estimate is applied to a detect/not detect comparison block and also to a block that performs a computation of an average power estimate using the expression:

$$y[n]=\alpha x[n]+(1+\alpha)y[n-1],$$

where y[n] is an estimate of the unsynchronized power level, x[n] is a power estimate at current pn code alignment, and y[n−1] is a previous power level estimate. The term $\alpha$ is a parameter that determines how fast the average power level responds to the current power estimate. The calculated current value of y[n] is then multiplied by a scaling factor to yield a detection threshold value for use by the comparator block in making a current detect/not detect decision based on the current power estimate $\chi$. If the current power estimate is larger than the threshold, a detection is declared and this information is then fed back to the transmitting SU 14, as described below with respect to FIGS. 4A and 4B. If the current power estimate is not larger than the threshold, a not detect state is declared instead. In the method described below the SU 14 can slip its timing by ½ chip and then transmit again.

Figure 6:
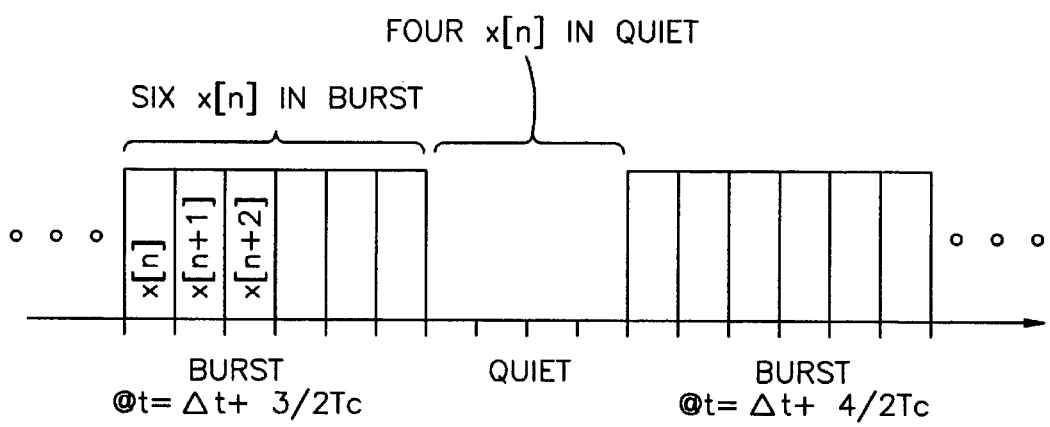
FIG. 6 is a time domain representation of bursts and "quiet" periods.

FIG. 6 illustrates a time domain representation of bursts and "quiet" periods. In this example a burst of six power estimates (x[n]) is followed by a quiet period of four power estimates. The next burst is then transmitted by an SU 14 with a pn phase that is delayed (slipped) by ½ chip from the previous phase.

Figure 5:
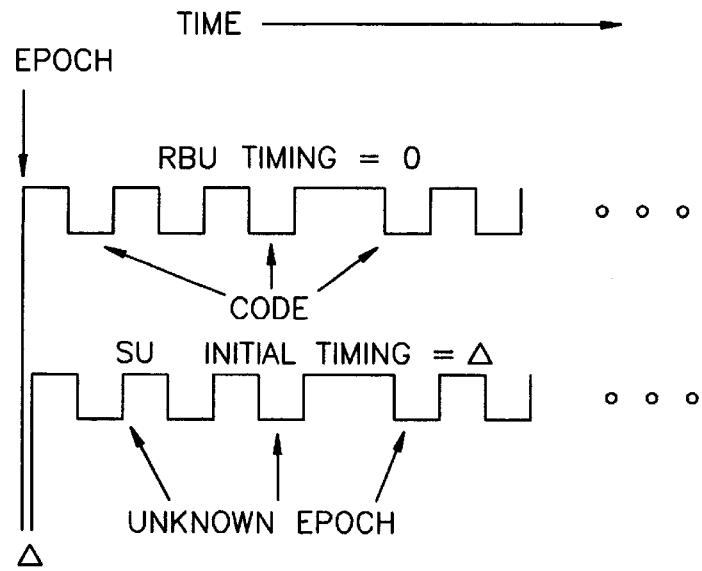
FIG. 5 is a timing diagram that illustrates RBU timing and epoch as well as an initial timing of a received SU signal. The epoch for the SU signal is unknown.
Figure 7:
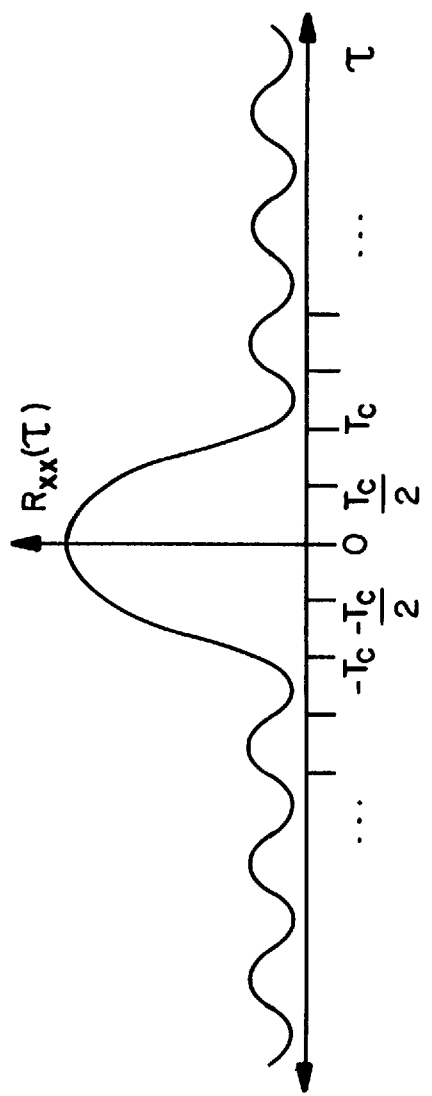
FIG. 7 is a graph illustrating an autocorrelation function of a pn spreading sequence. A peak exists in this function at $\rho=0$.

The acquisition procedure of this invention makes use of one of the properties of the spreading sequences. When the spread signal from the asynchronous side channel is aligned in time with the timing of the side channel receiver 12d, the energy as measured by the receiver 12d is greater in magnitude than when not aligned (see, for example, FIG. 5). This is due to the autocorrelation function of the spreading sequences, as is illustrated in FIG. 7. Therefore, the largest power estimate results when the side channel signal that is transmitted by the SU 14 is in alignment with the timing of the RBU's side channel receiver 12d.

Referring again to FIG. 1, each SU 14 includes an antenna 14a, a receiver 14b, a correlator 14c wherein the received FL transmission is despread using, by example, the side channel despreading pn code, and a SU processor or controller 14d. The SU controller 14d is responsible for managing the operation of the SU 14. These management functions include generating a variable local oscillator (LO) signal for down-converting a received FL signal, and providing the pn binary code sequences that are assigned to the SU 14 for despreading the side channel and also the user's signal. The SU controller 14d is also responsible for executing one or more of the synchronization methods in accordance with this invention, in cooperation with the RBU controller 12e. The SU 14 also includes a spreading circuit 14e for spreading a signal, such as the side channel signal, and a transmitter 14f for transmitting the DS-CDMA signal on the RL to the RBU 12.

For the presently preferred embodiments of this invention the antennas 12b and 14a have a line-of-sight relationship, the SUs 14 are fixed in location with respect to the RBU 12, and the antennas 12b and 14a are boresighted during installation of the SU 14. However, and as will be discussed below, the teachings of this invention are not limited to only this particular presently preferred arrangement.

The ensuing description assumes a DS signal, a(t), with code symbol duration $T_s$, multiplied by a spreading sequence c(t), with chip duration $T_c$ and a null-to-null bandwidth $W_c = 2/T_c$. By example, there may be M≦30 active users (SUs 14) in the CDMA communication system 10, each of which receives coded information symbols from the RBU 12, with an assigned length of P=32 code. All of the pn codes are mutually orthogonal when aligned, and are assumed to be accurately aligned during normal operation. In a presently preferred embodiment of this invention the pn codes are selected from a set of randomized Walsh-Hadamard codes. The symbol rate for each SU 14 is fixed at $1/T_s$, and the chipping rate at $1/T_c = P/T_s$. The teaching of this invention is not, however, limited to only signals having these characteristics. By example, the set of spreading codes can be selected from any set that exhibits low crosscorrelation at zero relative shift.

Furthermore, the ensuing description is directed towards presently preferred embodiments of methods for synchronization of the SU's spreading code timing at the RBU 12. These embodiments differ from conventional synchronization schemes, which are applicable for single-user systems, in that allowance is made for the presence of a number of interfering users (i.e., other SUs 14) on the same channel. In general, the methods of this invention search a range of possible timing offsets by varying the transmitter timing of the SU 14, and not by varying the RBU receiver timing, as is done in conventional approaches.

The methods, in a presently preferred embodiment of this invention, specifically apply to the asynchronous side channel, the use of which is assumed to be infrequent (e.g., during provisioning, after SU power outages, etc.).

The methods of this invention provide a means by which an SU 14 can become resynchronized to the system 10 in the event that it loses knowledge of the correct timing offset at which it should transmit. This invention uses a specific, dedicated signature sequence (pn spreading code), assigned at the time of system provisioning (i.e., during the installation of the SU 14 at the user's location, boresighting of the SU antenna 14a with the RBU antenna 12b, and initial acquisition by the SU 14 of the forward and reverse channels). Since the FL is continuously transmitting, when an SU 14 is activated one of the first operations that it performs is to acquire the FL side channel and begin processing the side channel data accordingly. Under normal operating conditions (after the SU 14 is successfully provisioned), the SU 14 stores the value of a timing offset at which it has been instructed (by the RBU 12) to transmit. The timing offset value is relative to a symbol boundary or epoch as defined by the received forward channel signal. If for some reason the SU 14 loses knowledge of this timing offset value, or has not yet obtained the value, as during initial provisioning, the SU 14 has no means of determining exactly when it should transmit. Thus, when it does begin transmission, it begins transmitting essentially asynchronously, as perceived at the RBU 12. This has the effect of introducing multi-user interference (MUI) to any other users on the RL, and in addition makes the detection of the asynchronously transmitting SU at the RBU 12 a more difficult problem, since from the perspective of the asynchronously transmitting SU's received signal, all other active users contribute MUI.

Given that asynchronous side channel usage by the SUs 14 is generally infrequent, a longer acquisition time can be tolerated on this channel. However, the sooner an asynchronously transmitting SU 14 is made synchronous, the sooner it stops contributing to, and suffering from, MUI.

The synchronization technique of this invention exploits the orthogonality of the signature (pn code) sequence set to aid in acquisition. If a given one of the SUs 14 is transmitting asynchronously, the resulting MUI makes detection of the asynchronous user more difficult, since the value of the detector output contains MUI that can be as large as the desired signal correlation (as shown in FIG. 3A).

Figure 3A:
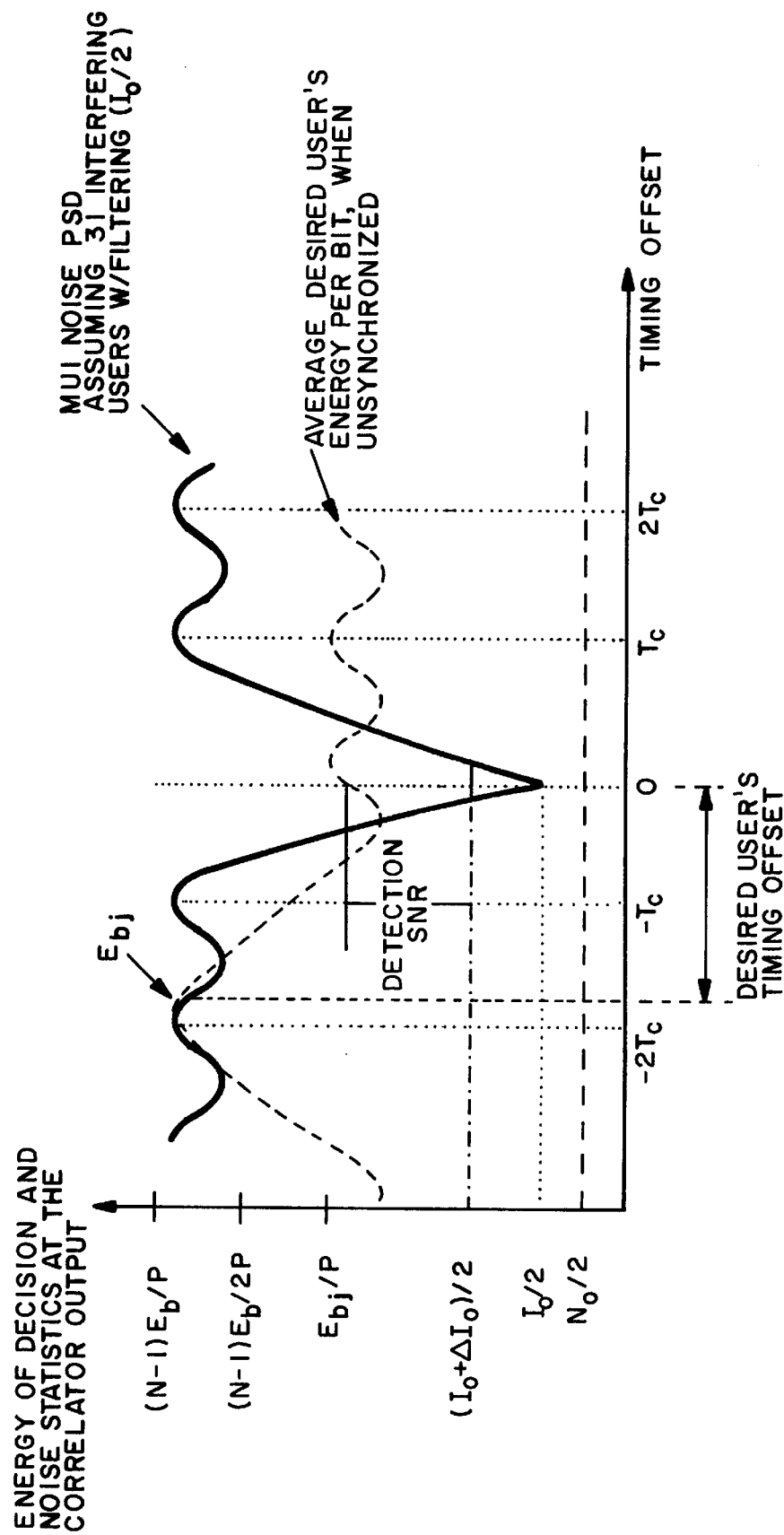
FIG. 3A is a graph that illustrates energy versus timing offset for a desired (asynchronous) user, for multiuser interference, and for background noise.

In FIG. 3A the solid curve represents the RBU detector (correlator) output energy (see FIG. 2) when MUI is input, and the dashed curve represents the detector output energy when the input is the desired SU signal, where in both cases the RBU 12 correlates with the desired SU signature sequence. Thus the timing offset axis is with respect to the desired SU receiver. Henceforth, reference is made to the (initially) asynchronous SU or user as the "desired" SU or user.

When a number (N-1) of synchronous SUs are present, the detector input signal is actually the sum of the desired user signal plus the MUI. Clearly, when the desired SU's timing offset is greater than approximately ½ of the chip duration $T_c$, the desired SU detector, which is correlating with an offset of zero, does not yield a high signal-to-noise ratio (SNR). In this situation, the SNR is approximately equal to $(E_{bj}/P)/(N_o+I_o+\Delta I_o)$, where $E_{bj}$ denotes the energy of the desired SU's correlation, P is the processing gain, $N_o$ represents the thermal noise (assumed small here), $I_o$ is the multi-user interference caused by pulse shape filtering, and the term $\Delta I_o$ represents additional MUI caused by the imperfect synchronization of the synchronous SUs. The desired SU's detection SNR is also indicated in FIG. 3A. By example, if P=32 the detection SNR for an asynchronous SU is reduced by 10 log (P) =15 dB from the synchronous value. Further by example, if P=128 then the corresponding SNR loss is approximately 21 dB.

In cases where the desired SU's received signal is faded, or when the $\Delta I_o$ term of the MUI is relatively large because of additional small timing offsets of the synchronous SUs 14, the reduction in detection SNR from asynchronism can be sufficient to prevent declaration of a "detection" at all, or will result in an unacceptably high bit error ratio (BER). In this case, the RBU 12 may not be able to instruct the desired SU 14 to correct its timing. If the desired SU's receiver at the RBU 12 were to shift its timing, the absolute energy of the detector output would increase, but the detection SNR would be even lower. Thus, what is required is an alternate technique to acquire the desired SU's signal at the RBU 12.

Figure 3B:
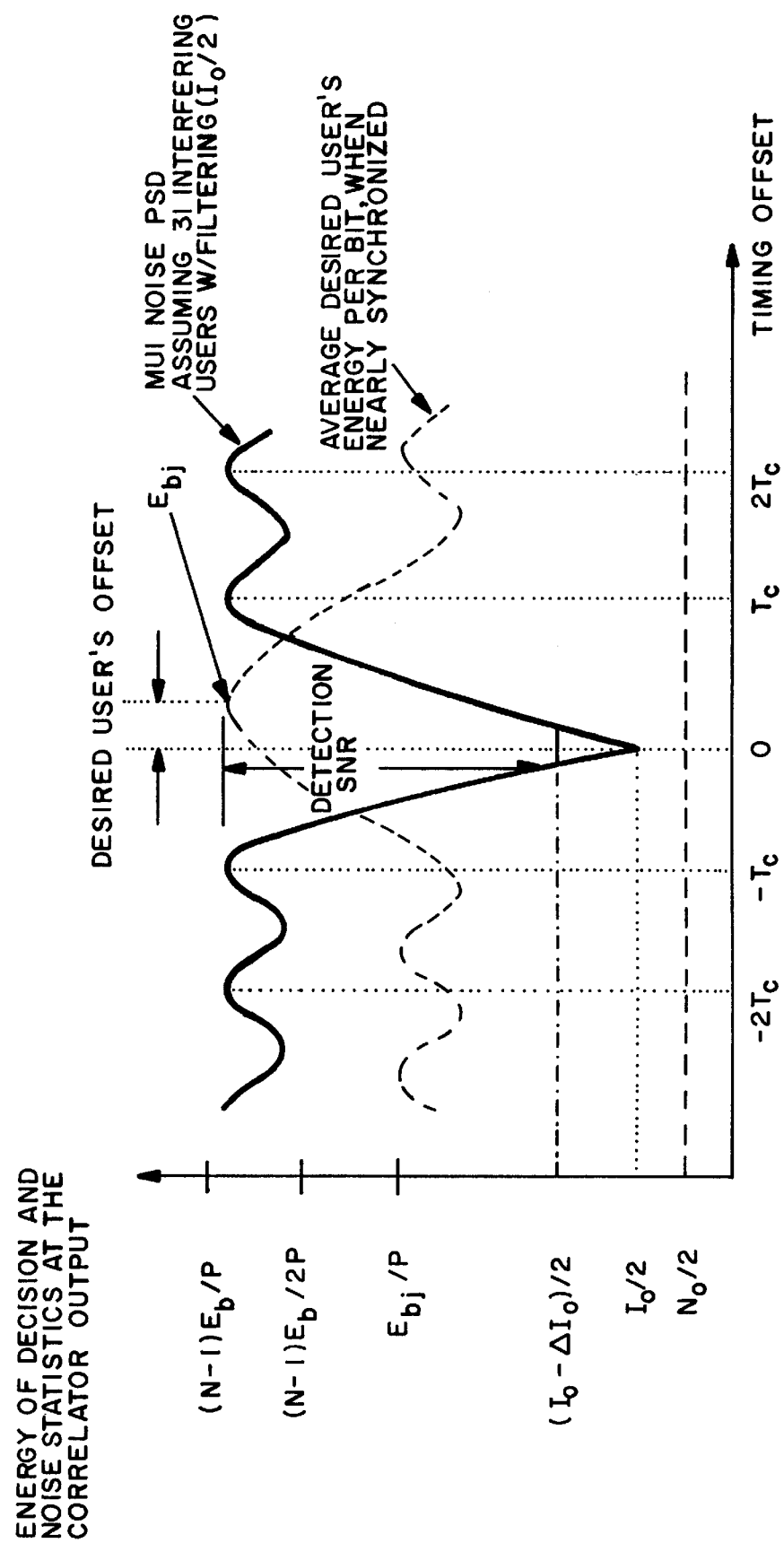
FIG. 3B is a graph that illustrates energy versus timing offset for the desired (now synchronized) user, for the multiuser interference, and for the background noise.

This alternate technique, in accordance with a first embodiment of this invention, is accomplished by having the SU 14 shift the timing of the transmitted signal until it comes into synchronism, as shown in FIG. 3B. The asynchronous side channel transmissions are burst transmissions, and after each burst, the SU 14 waits for a response from the RBU 12. Contained in each burst is the timing offset value used to transmit the burst. The response from the RBU 12 includes information as to a SU timing adjustment. If after a prescribed waiting period the SU 14 receives no response from the RBU 12, the SU 14 transmits another burst at another timing phase. This process is repeated until the SU 14 receives a response, or has tried all possible values of timing offset (e.g., 64 or 256 half-chip values. If after all values of timing offset have been tried by the SU 14, and no response has been received from the RBU 12, the SU 14 increases its transmit power by some increment, and repeats the process.

In some cases the asynchronous detection SNR is sufficient for the RBU's receiver 12d to process the signal. If the asynchronous SU's timing offset is such that an autocorrelation sidelobe lies at the correct timing phase, then it is possible that the detection SNR is adequate for processing the received signal. If this occurs the desired SU's receiver in the RBU 12 may conclude that the SU 14 is experiencing a fade, and can therefore command the SU 14 over the FL to increase its transmit power. This can result in raising the MUI level seen by the synchronous SUs 14, and could degrade their performance.

To avoid this possibility, and in accordance with a second embodiment of this invention, once the RBU 12 acquires the SU's signal and can adequately process the received burst transmissions, the RBU 12 responds with an acknowledgement message. The SU 14 then shifts its timing offset by some predetermined amount, for example by –J chips (e.g., J=16), and transmits again. The SU 14 then delays a prescribed amount of time, shifts its timing offset forward by ½ chip, and transmits again. This process is repeated until the SU 14 has transmitted 4J+1 bursts after the initial response from RBU 12. During transmission of these bursts the RBU 12 determines and stores in the memory 12f a correlation value obtained from the side channel receiver 12d. After the SU has transmitted all 4J+1 bursts, the RBU 12 responds with a command that instructs the SU 14 to use a timing phase that resulted in the largest detector correlation value. At this time, the RBU 12 and SU 14 then "fine tune" the SU timing to an optimum value.

Figure 4A:
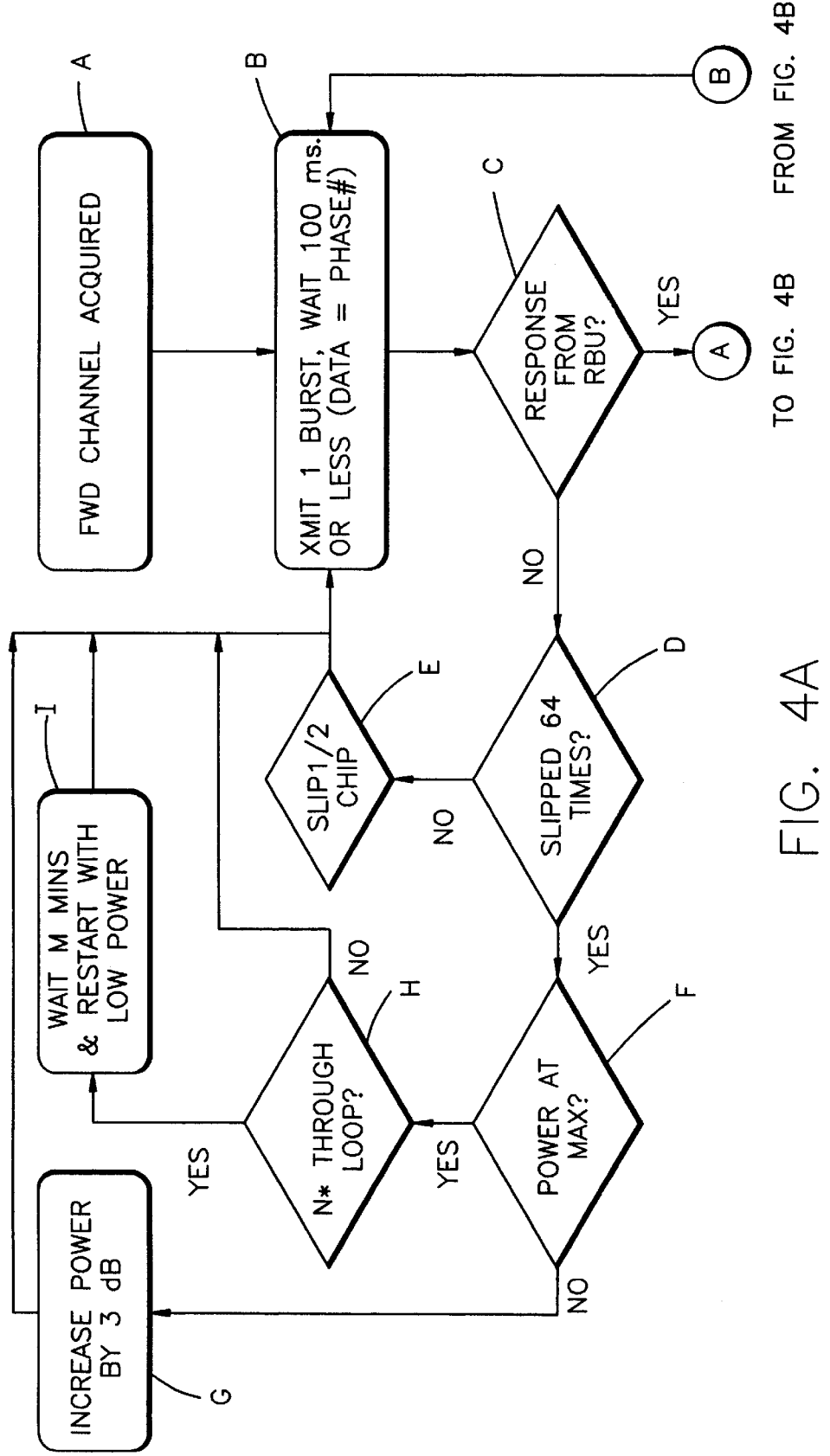
FIGS. 4A and 4B are a flow chart of an asynchronous reverse link side channel procedure, as executed by a SU in cooperation with the RBU.
Figure 4B:
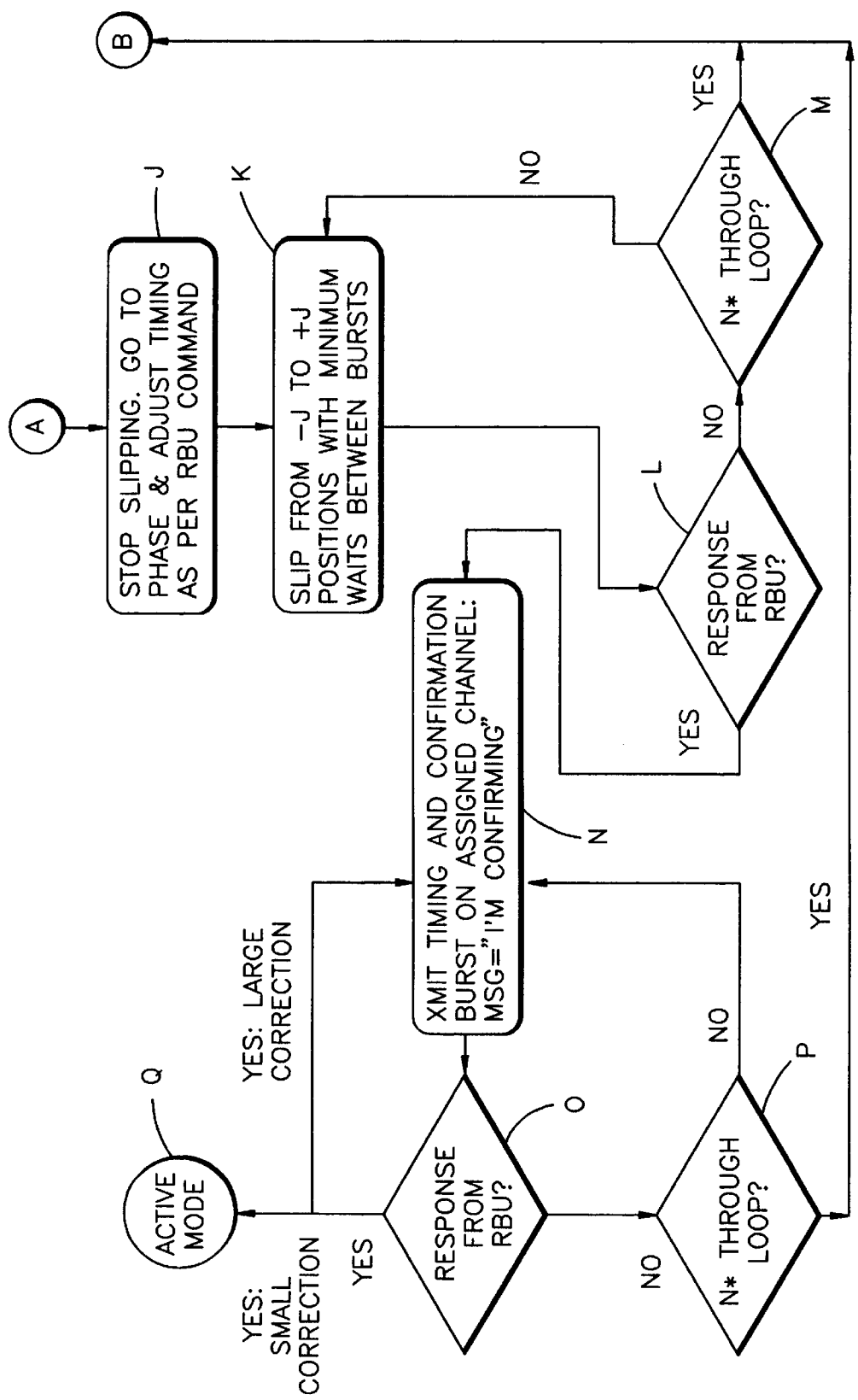

FIGS. 4A and 4B are a flow chart of the above-described asynchronous reverse side channel procedures, as carried out by the SU controller 14d in cooperation with the various other circuits of the SU 14.

At Block A the SU 14 acquires the forward side channel and at Block B transmits one burst on the reverse side channel using an initial phase timing. After a delay (e.g., 100 msec) control passes to Block C where the SU 14 determines if a response has been received from the RBU 12. Assuming for now that the result of this determination is No, control passes to Block D where a determination is made if the pn phase timing has been slipped by some maximum number (e.g., 64) of ½ chips. If No, control passes to Block E where the pn phase timing is slipped by ½ chip, and control then passes to Block B to transmit another burst with the slipped pn phase timing. If Yes at Block D, control passes to Block F to determine if the SU 14 transmitter power is at a maximum level. If No at Block F, the power of the SU transmitter 14f is increased by some increment (e.g., 3 dB) at Block G, and control passes to Block B to begin transmitting another sequence of bursts beginning with the initial phase timing offset. If Yes at Block F (i.e., the SU transmitter power is at maximum), then control passes to Block H where a determination is made if some predetermined number of passes through the loop have occurred. If No, control passes to Block B to begin transmitting another sequence of bursts beginning with the initial phase timing offset, and at the maximum power level. If Yes at Block H, control passes instead to Block I where a delay of M minutes is made (M may be a random value), the SU transmitter power level is reduced, with control eventually passing back to Block B.

Assuming now that the determination at Block C is Yes (a response is received from the RBU 12), control passes to Block J where the slipping of the pn phase timing is terminated. The SU 14 goes to a phase timing commanded by the RBU 12 and adjusts the timing as per the RBU command. At Block K the SU 14 begins slipping from –J to +J (e.g., J=16) phase timing positions with minimum delay between bursts. During this time the RBU 12 records the output of the correlator that is assigned to the SU 14. At Block L the SU 14 determines if a response is received from the RBU 12. If No, a determination is made at Block M if some predetermined number of passes have been made through the K, L, M loop. If No, control passes back to Block K. If Yes at Block M, control passes back to Block B to restart the synchronization procedure. If Yes at Block L (i.e., a response is received from the RBU 12), the SU 14 transmits at Block N a timing and confirmation burst on a channel assigned by the RBU in the response received at Block L. After transmitting the confirmation message control passes to Block 0 to wait for a further response from the RBU 12. If the response is not forthcoming a comparison is made at Block P to determine if the N, O, P loop has been executed some predetermined number of times. If No, control passes back to Block N to retransmit the confirmation message. If Yes at Block P, control passes back to Block B to restart the synchronization procedure. If Yes at Block 0, a determination is made if the RBU response indicates whether a large or small timing correction is required. If a large correction is required, the SU 14 adjusts its pn timing accordingly and then preferably transmits another timing and confirmation burst at Block N. If the response from the RBU 12 at Block O indicates that only a small correction is required, the SU 14 makes the indicated phase timing correction and thereafter enters the active communications mode at Block Q. That is, the SU 14 leaves the side channel and begins operating on an assigned communications channel.

In a further embodiment of this method the SU 14 steps through all possible timing offset values, during which the RBU does not reply, but stores in the memory 12f the detector correlation value at each timing phase for which sufficient SNR is present. As soon as the RBU 12 no longer detects the SU transmission, or after all possible correlation values are determined, the RBU 12 instructs the SU 14 to transmit at the timing offset value that yielded the largest correlation.

The probability of correct acquisition, given several different scenarios, can be determined for the system 10. For instance, the probability of correct detection can be determined for the case where there are no active synchronous users and the phase of the first burst is exactly ½ chip off of perfect alignment. This probability also depends on other factors such as the power of the asynchronous SU 14 and the threshold value determined in FIG. 2. In a worst case analysis, all non-aligned phases are transmitted before the correct phase.

In the worst case, for correct detection to take place there should not be a detection on any non-aligned phases, and the detection should take place only on the aligned burst. Also, the detection should take place on the first power estimate of an aligned burst, thereby allowing the receiver 12c of FIG. 1 sufficient time to track the carrier phase and resolve any I and Q ambiguity.

Power estimates can be calculated for all 64 phases (i.e., all 64 "slips"), as well as for the periods when the asynchronous SU transmitter is "quiet" (see FIG. 6). A large number of variables can exist when making the power estimates. By example, there can be differences in the number of active synchronous SUs, the power levels of the asynchronous SUs, and the initial timing offset relative to the ½ chip slips. Another variable is the dwell time or the time between bursts ("quiet" periods).

A mean and variance for all 64 phases and for the "quiet" periods can be computed. Since the power estimate is the sum of a large number of random variables, it can be assumed that the power estimate at a given phase has a Gaussian distribution.

With the knowledge of the mean and variance of the power estimates at all phases and during the "quiet" periods, as well as the mean of the average power estimates, a probability of correct detection can be calculated. For the following examples, it is assumed that the average power estimates have zero variance. Actually, for an a (filter coefficient) of 0.01, the variance of the average power estimate is many times smaller than the variance of the power estimates. Therefore, to assume that the average power estimate is a constant has little effect on the probabilities.

For a given non-aligned phase, the probability that there is a false detection at a certain threshold is given by $$\text{Pr(false detection at phase i}|\text{phase i is transmitted)}=1-F(\text{threshold}-\text{mean(i)}, \sqrt{\text{variance(i)}}), \quad (1)$$

where F() is the cumulative distribution function of a zero mean Gaussian distribution with a variance of (i), the threshold is computed as in FIG. 2, and mean(i) is the mean of the power estimate at phase i. For clarity, the above probability is denoted as Pr(false on i). The cumulative distribution function, Fo can also be written in terms of the error function, $$F(x,\sigma) = \frac{1}{2} + \frac{1}{2} \cdot erf\left(\frac{x}{\sqrt{2} \cdot \sigma}\right) \quad (2)$$

The probability of false detection can be calculated from the previous probabilities. In the worst case, it is simply one minus the probability that the transmitter slips through all the non-aligned phases without a detection. Or, $$\text{Pr (worst case false detection) 1}-\text{Pr(slip through non-aligned phases without detection)}. \quad (3)$$

If the non-aligned phases are numbered from, by example, 2 to 63, the probability can be expressed that the SU transmitter slips through all the non-aligned phases without a detection as, $$\text{Pr(slip through non-aligned phases without detection)}=(1-\text{Pr(false on 2)})^{6*}(1-\text{Pr(false on quiet)})^{4*}(1-\text{Pr(false on 3)})^{6*}(1-\text{Pr(false on quiet)})^{4*}(1-\text{Pr(false on 63)})^{6*}(1-\text{Pr(false on quiet)})^{4} \quad (4)$$

or, $$\text{Pr(slip through non-aligned phases without detection}=\Pi_{i-all\ non-aligned\ phases}[(1-\text{Pr(false on i)})^{6*}(1-\text{Pr(false on quiet)})^{4})]. \quad (5)$$

For a given aligned phase, the probability that there is a true detection at a certain threshold is given by $$\text{Pr(true detection at phase i}|\text{phase i is transmitted)}=1-F(\text{threshold}-\text{means(i)}, \sqrt{\text{variance(i)}}). \quad (6)$$

For clarity, the above probability is denoted as Pr(true on i). The probability of a correct detection can be calculated from the above probabilities in the following manner:

$$\text{Pr(a given acquisition is correct)}=\text{Pr(correct phase is detected}|\text{no previous detection)} *\text{Pr(no previous detection)}. \quad (7)$$

In the worst case, the probability that there is no previous detection is given by equation (5). Also, it is assumed that the RBU 12 should detect on the first of six power estimates of an aligned phase to declare a correct detection. If it is assumed there are two aligned phases, then these would correspond to phases of −¼ chip and +¼ chip, which are now numbered as phase 0 and 1. The following probabilities are different for three aligned phases (i.e., −½, 0, ½ chip) but the approach is the same. For this example, Pr(correct acquisition)=Pr(correct detect on phase 0|no previous false detection)

*Pr(no previous false detection) +Pr (correct detect on phase 1|no previous detection)

*Pr(no previous detection) =Pr (true on 0)*Pr(no false detection) +Pr (true on 1)*Pr(no false detection)

*(1−Pr(true on 0))$^6$

*(1−Pr(false on quiet))$^4$, (8)

where Pr(no false detection) is given by equation (5). This is the worst case probability of correct detection where the SU transmitter slips through all non-aligned phases before transmitting at an aligned phase.

While the invention has thus been particularly shown and described above with respect to a number of embodiments thereof, it will be understood by those skilled in the art that changes in form and details may be made therein without departing from the scope and spirit of the invention. For example, it should be realized that the teaching of this invention is not limited to any of the exemplary frequencies, pn code lengths or types, transmitter powers, numbers of users, despreader and detector embodiments, and the like that were described above.

It should further be understood that the teaching of this invention is not limited for use with the RF transmitters and receivers illustrated in FIG. 1. That is, in other embodiments of this invention the CDMA forward and reverse link signals can be conveyed through, by example, coaxial cable or fiber optic cable. The CDMA signal could also be conveyed through water, using suitable acoustic transducers.

The above described embodiments should thus be viewed as being exemplary of the teaching of this invention, and should not be construed in a limiting sense upon the practice of this invention.

What is claimed is:

1. In a synchronous CDMA communications system using orthogonal pn spreading codes, a method for synchronizing transmissions from a subscriber unit (SU) to a radio base unit (RBU), comprising the steps of:
   (a) transmitting individual ones of a plurality of bursts from the SU to the RBU, each burst being transmitted with a different pn spreading code timing alignment;
   (b) receiving individual ones of the plurality of bursts with the RBU and determining a power estimate of each received burst; and
   (c) in response to a determined power estimate of one of the bursts exceeding a threshold, initiating the synchronization of subsequent transmissions from the SU by sending a message from the RBU to the SU, the message indicating that the SU is to use for the subsequent transmissions the pn spreading code timing alignment that was employed when transmitting the one of the bursts.

2. A method as set forth in claim 1, wherein the step of transmitting includes a step of transmitting an indication of the pn spreading code timing alignment used when transmitting each of the plurality of bursts.

3. A method as set forth in claim 1 wherein the step of receiving includes the steps of:
   summing M samples per chip to obtain a first result;
   despreading the first result;
   summing L chips per symbol from the first result to obtain a second result;
   summing a plurality of symbols from the second result to obtain a power estimate of a current pn spreading code timing alignment that was transmitted by the SU;
   obtaining an averaged power estimate that includes a power estimate from a previous pn spreading code alignment for forming the threshold; and
   comparing the power estimate of the current pn spreading code timing alignment to the threshold.

4. A method as set forth in claim 1, wherein in response to the SU exhausting a predetermined range of permissible pn spreading code timing alignments, performing the steps of increasing an output power of an SU transmitter, and re-executing the steps (a)–(c).

5. A method as set forth in claim 1, wherein each burst is transmitted with a pn spreading code timing alignment that differs by ½ chip from a previous pn spreading code timing alignment.

6. A method as set forth in claim 1, wherein each transmitted burst is separated by a period of no transmission by the SU, and further comprising a step of also determining a power estimate during the period of no transmission by the SU.

7. A method as set forth in claim 1, and further comprising the steps of:
   in response to the RBU sending the message, changing the pn spreading code timing alignment by a predetermined number of chips;
   transmitting individual ones of a second plurality of bursts from the SU to the RBU, each burst being transmitted with a different pn spreading code timing alignment;
   receiving the second plurality of bursts in RBU and storing, for each received burst, a corresponding magnitude of a pn correlation value; and
   after receiving a predetermined number of the second bursts, transmitting a message to the SU, the message instructing the SU to use for subsequent transmissions a pn spreading code timing alignment that corresponds to a largest stored pn correlation value.

8. In a synchronous CDMA communications system using orthogonal pn spreading codes, a method for synchronizing transmissions from a subscriber unit (SU) to a radio base unit (RBU), comprising the steps of:
   transmitting individual ones of a plurality of bursts from the SU to the RBU, each burst being transmitted with a different pn spreading code timing alignment;
   receiving the plurality of bursts in the RBU and storing, for each received burst, a corresponding magnitude of a pn correlation value; and
   after receiving a predetermined number of the plurality of bursts, sending a message to the SU, the message instructing the SU to use for subsequent transmissions a pn spreading code timing alignment that corresponds to a largest stored pn correlation value.

9. A method as set forth in claim 8, wherein the step of transmitting includes a step of transmitting an indication of the pn spreading code timing alignment used when transmitting each of the plurality of bursts.

10. A method as set forth in claim 8, wherein each burst is transmitted with a pn spreading code timing alignment that differs by ½ chip from a previous pn spreading code timing alignment.

11. A synchronous CDMA communications system using orthogonal pn spreading codes, said synchronous CDMA communications system comprising at least one subscriber unit (SU) and at least one radio base unit (RBU), said synchronous CDMA communications system further comprising apparatus for synchronizing transmission from the SU to the RBU, said apparatus being comprised of:
   means in said SU for transmitting individual ones of a plurality of bursts to the RBU, each burst being transmitted with a different pn spreading code timing alignment;
   means in said RBU for receiving individual ones of the plurality of bursts and for determining a power estimate of each received burst; and
   means, responsive to a determined power estimate of one of the bursts exceeding a threshold, for sending a message from the RBU to the SU, the message indicating that the SU is to use for subsequent transmissions the pn spreading code timing alignment that was employed when transmitting the one of the bursts.

12. A system as set forth in claim 11, wherein said transmitting means transmits an indication of the pn spreading code timing alignment used when transmitting each of the plurality of bursts.

13. A system as set forth in claim 11 wherein said receiving means is comprised of:

means for summing M samples per chip to obtain a first result;

means for despreading the first result;

means for summing L chips per symbol from the first result to obtain a second result;

means for summing a plurality of symbols from the second result to obtain a power estimate of a current pn spreading code timing alignment that was transmitted by the SU;

means for obtaining a scaled averaged power estimate that includes a power estimate from a previous pn spreading code alignment for forming the threshold; and means for comparing the power estimate of the current pn spreading code timing alignment to the threshold.

14. A system as set forth in claim 11, wherein in response to the SU exhausting a predetermined range of permissible pn spreading code timing alignments, said SU further comprises means for increasing an output power of transmitter of the SU, and for re-transmitting individual ones of the plurality of bursts to the RBU.

15. A system as set forth in claim 11, wherein each burst is transmitted with a pn spreading code timing alignment that differs by ½ chip from a previous pn spreading code timing alignment.

16. A system as set forth in claim 11, wherein each transmitted burst is separated by a period of no transmission by the SU.

17. A system as set forth in claim 11, and further comprising:

means in said SU, responsive to the RBU sending the message, for changing the pn spreading code timing alignment by a predetermined number of chips;

means for transmitting individual ones of a second plurality of bursts to the RBU, each burst being transmitted with a different pn spreading code timing alignment;

means in said RBU for receiving the second plurality of bursts and for storing, for each received burst, a corresponding magnitude of a pn correlation value; and means in said RBU, responsive to receiving a predetermined number of the second bursts, for transmitting a message to the SU, the message instructing the SU to use for subsequent transmissions a pn spreading code timing alignment that corresponds to a largest stored pn correlation value.

* * * * *